United States Patent [19]
Robbins

[11] 4,086,719
[45] May 2, 1978

[54] FISHING SINKER

[76] Inventor: Robert Robbins, P.O. Box 20202, Atlanta, Ga. 30325

[21] Appl. No.: 678,118

[22] Filed: Apr. 19, 1976

[51] Int. Cl.² .............................................. A01K 95/00
[52] U.S. Cl. ..................................................... 43/44.9
[58] Field of Search .................... 43/44.96, 44.97, 44.9

[56] References Cited

U.S. PATENT DOCUMENTS

| | | | |
|---|---|---|---|
| 2,033,683 | 3/1936 | Clark | 43/44.96 |
| 2,237,540 | 4/1941 | Asprer | 43/44.96 X |
| 2,263,674 | 11/1941 | Casella | 43/44.9 |
| 2,577,549 | 12/1951 | Vice | 43/44.97 |
| 2,917,861 | 12/1959 | Hines | 43/44.96 |
| 3,359,676 | 12/1967 | Crossan | 43/44.97 |

FOREIGN PATENT DOCUMENTS

| | | | |
|---|---|---|---|
| 261,687 | 6/1964 | Australia | 43/44.9 |
| 556,508 | 4/1958 | Canada | 43/44.9 |

*Primary Examiner*—Russell R. Kinsey
*Assistant Examiner*—Daniel J. Leach
*Attorney, Agent, or Firm*—Sherman & Shalloway

[57] ABSTRACT

A thin, elongated and wide fishing sinker is disclosed which secures itself along the bottom of moving bodies of water and sustantially fully within the boundary-layer zone adjacent the bottom.

6 Claims, 5 Drawing Figures

FISHING SINKER

BACKGROUND OF THE INVENTION

The present invention relates to fishing sinkers and is concerned, more particularly, with low-profile and low center of gravity sinkers which are stable in holding the bottom in relatively fast-moving water currents.

BRIEF DESCRIPTION OF THE PRIOR ART

A wide variety of fishing sinkers have been developed for holding bait or lures at desired depths and under differing circumstances.

These have ranged from simple chunks of lead to a variety of quite sophisticated designs incorporating hydrodynamic principles, vanes, variable hitchpoints and other complexities ostensibly suitable for varying stream conditions, trolling rates or entanglement problems. However, many such complex depth-control devices are more successful in their capacity to intrigue potential purchasers than in serving their desired function.

In general, the more complex sinkers and depth control devices have a degree of utility in trolling, in which their hydrodynamic shapes and variable linkage cooperate with selectable boat speeds to provide a desired depth for the bait or lure.

However, when fishing in streams or other waters, without a boat with which to troll, such complex rig and sinker designs are of little value, since the fisherman has no control over the relative velocities of the rig and the ambient water flow.

This is further complicated by the variations in water velocity and the eddy currents which are encountered in differing areas. Considerable velocity changes are found, for example, in adjacent narrow- and wide-portions of a river, or between confining obstructions such as rocks.

Therefore, the more commonly-used form of sinker for this type of fishing has been the solid-chunk, lead-type sinker. These have been available in generally egg-shaped, semi-pyamidal or conical shapes and in a wide variety of weights.

The wide variety of weights and relatively easy changeability of such sinkers have enabled fisherman to vary the weighting on their lines to provide at least enough weight to effect the desired depth control.

However, these bulky forms of sinkers impose an additional drag factor, in moving water, so that excessive or extra weight, in addition to that required for holding the bait down, is needed to overcome the inherent drag of the sinker itself. Consequently, prior forms of plain sinkers have involved the use and transport of considerable numbers and total weights of lead, to provide sufficient options, or the selection of only a few sinkers of quite excessive weight to guarantee adequate control.

Additionally, the bulk and shape of such sinkers has posed quite a problem with regard to storage space in tackle boxes, which typically are otherwise quite crowded with more pertinent items such as lures.

Therefore, the sinkers heretofore available, although they have been effective by reason of their excessive weight for their service requirements, have involved many problems and have not been found to be entirely satisfactory.

SUMMARY OF THE INVENTION

In general, the preferred form of sinker comprises a thin metallic body having line-engaging means and having a length at least three times its thickness and a width at least two and one-half times its thickness.

Preferably, the length of the body is at least one and one-half times its width and at least four times the thickness.

A particularly advantageous form of sinker of the present invention includes a bore extended longitudinally through the body and providing for running engagement with a fishing line.

Sinkers embodying the present invention exhibit a surprising stability for their total weight and have been found to be reliable in positioning baits or lures at about half the total sinker weight required in conventional sinkers in comparable circumstances.

The sinkers of the present invention thus are effective in controlling lures in circumstances in which prior sinkers of equal weight are inadequate.

Surprisingly, in spite of the large surface area present on the generally-flat, flank surfaces, the new sinkers quickly seek the bottom of the stream and hug the bottom with their center of gravity closely adjacent the bottom and with their minimum profile presented to the moving water.

The new sinkers thus provide insufficient surface area against which the water can exert a force sufficient to dislodge the mass of the sinker. Accordingly, the new sinkers are disproportionately effective for their weight, in comparison to prior forms of sinkers.

OBJECTS OF THE INVENTION

It is an object of the present invention to provide a simple and reliable fishing sinker of maximum effectiveness for its weight.

It is a further object of the present invention to provide a simple and reliable sinker which is stable and retains its position on the bottom of bodies of water in conditions of normal, high-velocity flow of the water.

It is another object of the present invention to provide a simple and reliable fishing sinker having a low profile and which holds the bottom with its center of gravity closely adjacent the bottom.

It is a further object of the present invention to provide a simple and reliable fishing sinker which is thin in relation to its length and width and which holds bottom substantially within the boundary layer or zone of water immediately adjacent the bottom.

A further object of the present invention is the provision of a simple and reliable fishing sinker which is thin in relation to its length and narrow in relation to its length and which has generaly flattened flank areas for engagement with the bottom of moving bodies of water.

BRIEF DESCRIPTION OF THE DRAWINGS

A better understanding of these and other objects of the present invention and of the invention itself may be derived from the following description and the accompanying drawings, in which.

DETAILED DESCRIPTION OF THE PREFERRED EMBODIMENT

Figure 1:
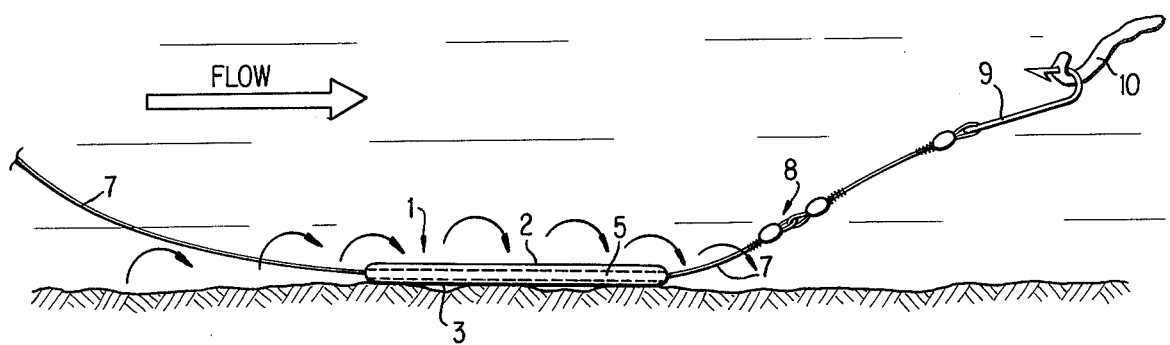
FIG. 1 is a side view of a preferred embodiment of the present invention in service and in its position hugging the bottom of a moving body of water.
Figure 2:
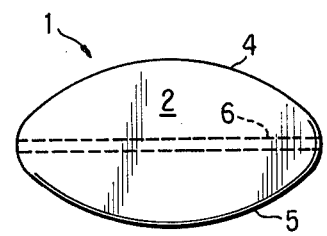
FIG. 2 is a plan view of the sinker of FIG. 1.
Figure 3:
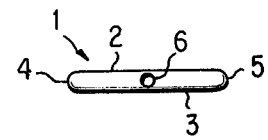
FIG. 3 is an end view taken from the left-hand side of FIG. 1.

As shown in FIGS. 1 - 4, the preferred form of sinker of the present invention comprises a thin body 1 of lead or a heavy alloy and which has opposed flank areas 2 and 3 which are generally flat and which are oval in outline, as best shown in FIG. 2 and which are joined by rounded edges 4 and 5.

The body 1 has a line-receiving bore 6 therein oriented along the major axis of the oval flanks and preferably of sufficient diameter to receive at least two courses of fishing line or leader material.

As shown in FIG. 1, the sinker is rigged in a running fit with the fishing line 7 passed straight through to a rig including, for example a swivel 8, hook 9 and bait strip 10. It is to be understood, however, that any form of bait rig or lure may be employed with the sinker of the present invention.

The running mount of the sinker is preferred, since it permits a degree of relative motion between the bait and line and the positioned sinker, as well as transmitting the feel of a strike directly along the line to the rod, with a minimum of snubbing or shock absorbing by the mass of the sinker. However, if desired, the preferred sinker may be tied in a fixed position on the line by a loop-and-double-pass of the line through the bore 6.

It is not necessary that the flank surfaces of the sinker be either absolutely flat or absolutely parallel, as long as the maximum thickness is limited to no more than 33% of the length and no more than 40% of the width of the body, the term "length" being used in reference to the longest dimension of the flank surfaces.

Unusual results and stability have been found to be obtained with sinkers whose length is at least four times their thickness at least one and one-half times their maximum width.

For example lead sinkers of the following specifications perform and control baits comparably with conventional sinkers weighing 75% to 100% more:

|   | Weight | Length | Width | Thickness |
|---|--------|--------|-------|-----------|
| A | ¼oz.   | 0.875in. | 0.56 | 0.188 |
| B | ½oz.   | 1.06in. | 0.68 | 0.22 |
| C | 1oz.   | 1.25in. | 0.75 | 0.30 |

The dimensional relationships, therefore, are as follows:

|   | Weight | L/T | W/T | L/W |
|---|--------|-----|-----|-----|
| a | ¼oz.   | 4.65 | 2.98 | 1.56 |
| b | ½oz.   | 4.82 | 3.09 | 1.55 |
| c | 1oz.   | 4.03 | 2.5 | 1.66 |

The flank surfaces of these sinkers were oval in outline and otherwise in accordance with the drawings, including the provision of a longitudinal bore for receiving the fishing line in a running relationship.

The oval contour of the flank areas is of particular advantage, in that this structure presents a tapering or progressive frontal area against which the water impinges.

The exact mechanism by which the sinkers of the present invention achieve their exceptional bottom-hugging stability, with decreased sinker weight, is not completely understood. However, it is believed that the low profile of the new sinkers permits their surface areas and their center of gravity to lie mostly within the boundary layer or zone of reduced velocity adjacent the natural bottom along which the water flows. The friction or drag of the solid bottom surface slows the flow along the surface and causes a relatively narrow zone of reduced-velocity, eddying type of flow, as generally represented by the curvate arrows in FIG. 1.

Therefore, with the structure and the center of gravity of the sinker positioned substantially within this boundary layer or zone, the sinker experiences considerably less kinetic or sweeping force and, since it presents a minimal frontal area to the flow, tends to seek and maintain a stable position lying flat along the bottom.

Figure 4:
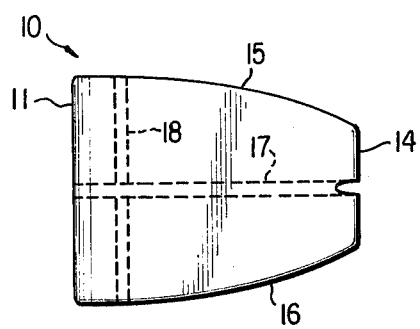
FIG. 4 is a view generally similar to FIG. 1 and showing a modified form of sinker of the invention.
Figure 5:
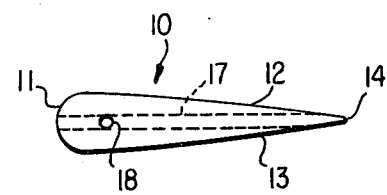
FIG. 5 is a plan view of the sinker of FIG. 4.

A modified form of sinker embodying the invention is shown in FIGS. 4 and 5 and includes a rounded forward edge 11 joining opposite flank areas 12 and 13 which slant toward each other to form a thin trailing edge 14. The flank areas progressively taper along their lateral edges 15 and 16.

The line-engaging means includes a first bore 17 oriented along the longitudinal center of the sinker and a second, transverse bore 18 passed through the thicker portion of the sinker generally parallel to the leading edge 11.

The sinker of FIGS. 4 and 5 is formed with a length (along bore 17) about four times the maximum thickness and an average width about 3 times the maximum thickness. The sinker is particularly suitable for use in relatively fast moving currents of fairly constant direction of flow, as may be encountered in narrowed portions of streams.

When the bait is to be positioned downstream of the fisherman, the longitudinal bore 17 may be employed in the same manner as the bore 6 of the sinker of FIG. 1.

However, when the desired bait position is transverse of the stream from the fisherman's position, the transverse bore 18 may be employed. The sinker then is prone to a slight skewing by the drag of the bait, with the leading edge at a slight angle to the water flow. In this relationship to the flow, right-angle bends in the line may be avoided, thereby preserving a greater amount of the "feel" of the running mount of the sinker.

The tapering of the flank areas 12 and 13 to the thin edge 14 reduces the turbulence immediately downstream of the trailing edge 14. The tapering of the edges 15 and 16 is particularly effectively presenting a progressive surface when the sinker is slightly skewed with respect to the water flow.

Other shapes of sinkers may be employed, within the dimensional ranges set forth, apparently because of the boundary layer or "wall effect" on the water current immediately adjacent the bottom, and the consequent reduction of velocity in that zone. The thin, elongated sinkers thus hug the bottom with their flank area and have their center of gravity and their profile in the more quiescent boundary layer, without substantial projection thereof into the more free-flowing water.

When not in service in actual fishing, the sinkers of the present invention afford distinct advantages to the fisherman by reason of their more efficient shape, per unit weight, in terms of the volume they consume in the tackle box. The new weights are easily stacked or readily inserted in narrow zones of the tackle box, without the waste of space therein which is typically present with and around the bulky forms of sinker.

At the same time, the service-stability of the new sinkers, in relation to their gross weight, reduces the overall weight of sinker-lead that has to be lifted and carried around with the tackle box.

Therefore, it is evident that the new sinkers provided by the present invention are uniquely effective in their performance and exhibit advantages which are not afforded by prior sinkers.

Various changes may be made in the details of the invention, as disclosed, without sacrificing the advantages thereof or departing from the scope of the appended claims.

What is claimed is:

1. A sinker for holding down a running fishing line in bodies of water in which there is a current, said sinker comprising:

an elongated relatively flat body of heavy material having a length which is at least 4 times the thickness thereof and a width which is at least two and one-half times the thickness thereof;

said elongated body being defined by oppositely disposed generally planar flank areas and continuous side edges and including a centered longitudinal bore therethrough through which the running fishing line passes, wherein when the sinker rests on a bottom of a body of water, eddy currents created by the current flowing over the sinker in cooperation with slippage of the running line stabilizes the sinker so that the sinker is not moved by slight forces on the running line.

2. The sinker of claim 1 in which said flank areas are substantially parallel to each other.

3. The sinker of claim 2 in which said body is oval.

4. The sinker of claim 1 in which said flank areas converge toward a first longitudinal end of said body.

5. The sinker of claim 4 in which the lateral edges of said body progressively converge toward said first longitudinal end of said body.

6. The sinker of claim 1 in which said line engaging means includes a second bore extended transversely of said body.

* * * * *